United States Patent
Schott et al.

(10) Patent No.: US 7,166,031 B2
(45) Date of Patent: Jan. 23, 2007

(54) TORQUE TRANSMISSION DEVICE

(75) Inventors: Wilhelm Schott, Köln (DE); John Zubik, Lockport, IL (US); Nolan House, Clarendon Hills, IL (US); Dan Pedersen, Villa Park, IL (US)

(73) Assignee: GKN Walterscheid GmbH (DE)

( * ) Notice: Subject to any disclaimer, the term of this patent is extended or adjusted under 35 U.S.C. 154(b) by 0 days.

(21) Appl. No.: 10/796,536

(22) Filed: Mar. 9, 2004

(65) Prior Publication Data

US 2005/0202882 A1 Sep. 15, 2005

(51) Int. Cl.
*F16D 3/48* (2006.01)

(52) U.S. Cl. ...................................... 464/137; 464/160

(58) Field of Classification Search ................ 464/137, 464/160; 56/DIG. 6
See application file for complete search history.

(56) References Cited

U.S. PATENT DOCUMENTS

| | | | | |
|---|---|---|---|---|
| 3,003,340 | A | * 10/1961 | Miller | ......................... 464/160 |
| 3,050,965 | A | * 8/1962 | Landrum | ..................... 464/160 |
| 4,464,137 | A | * 8/1984 | Jennings | ................. 464/160 X |
| 4,468,206 | A | 8/1984 | Herchenbach et al. | |
| 4,932,809 | A | 6/1990 | Kopp | |
| 5,681,222 | A | 10/1997 | Hansen et al. | |
| 5,762,556 | A | 6/1998 | Kurian | |
| 6,743,105 | B1 * | 6/2004 | Yabe | |

FOREIGN PATENT DOCUMENTS

| | | | |
|---|---|---|---|
| DE | 32 05 513 C1 | 3/1983 | |
| DE | 44 45 634 C2 | 10/1997 | |
| GB | 978027 | * 12/1964 | ................. 464/137 |
| GB | 2 296 308 A | 6/1996 | |
| GB | 2 354 050 | 3/2001 | |

* cited by examiner

*Primary Examiner*—Greg Binda
(74) *Attorney, Agent, or Firm*—Harness, Dickey & Pierce, P.L.C.

(57) ABSTRACT

A torque transmission device, for driving or in drives of agricultural implements or self-propelled working machines, has a coupling (6) with a coupling housing (7) including a connection plate (10) and a coupling hub (8). Torque transmission elements (9) are positioned between the two in at least one rotational direction for transmitting a torque between the two. A driving member (20) defines a longitudinal axis (14). The driving member (20) is provided with distributedly arranged second driving elements (22) around the circumference of and radially projecting from a driving member portion (21). Gaps (23) are formed in a circumferential direction between the second driving elements (22). A support plate (12) is present on which the driving member (20) is rotationally supported around the longitudinal axis (14). First driving elements (15), as distance holders, retain the support plate (12) at an axial distance to the connection plate (10) on the coupling housing (7). A space (17) is formed between the driving member (20) and the connection plate (10). The driving member portion (21) of the driving member (20) is received in the space (17). The first driving elements (15) engage driving member (22) in the gaps (23) in a circumferential direction around the longitudinal axis (14) with a limited rotational free motion in reference to the connection plate (10).

11 Claims, 4 Drawing Sheets

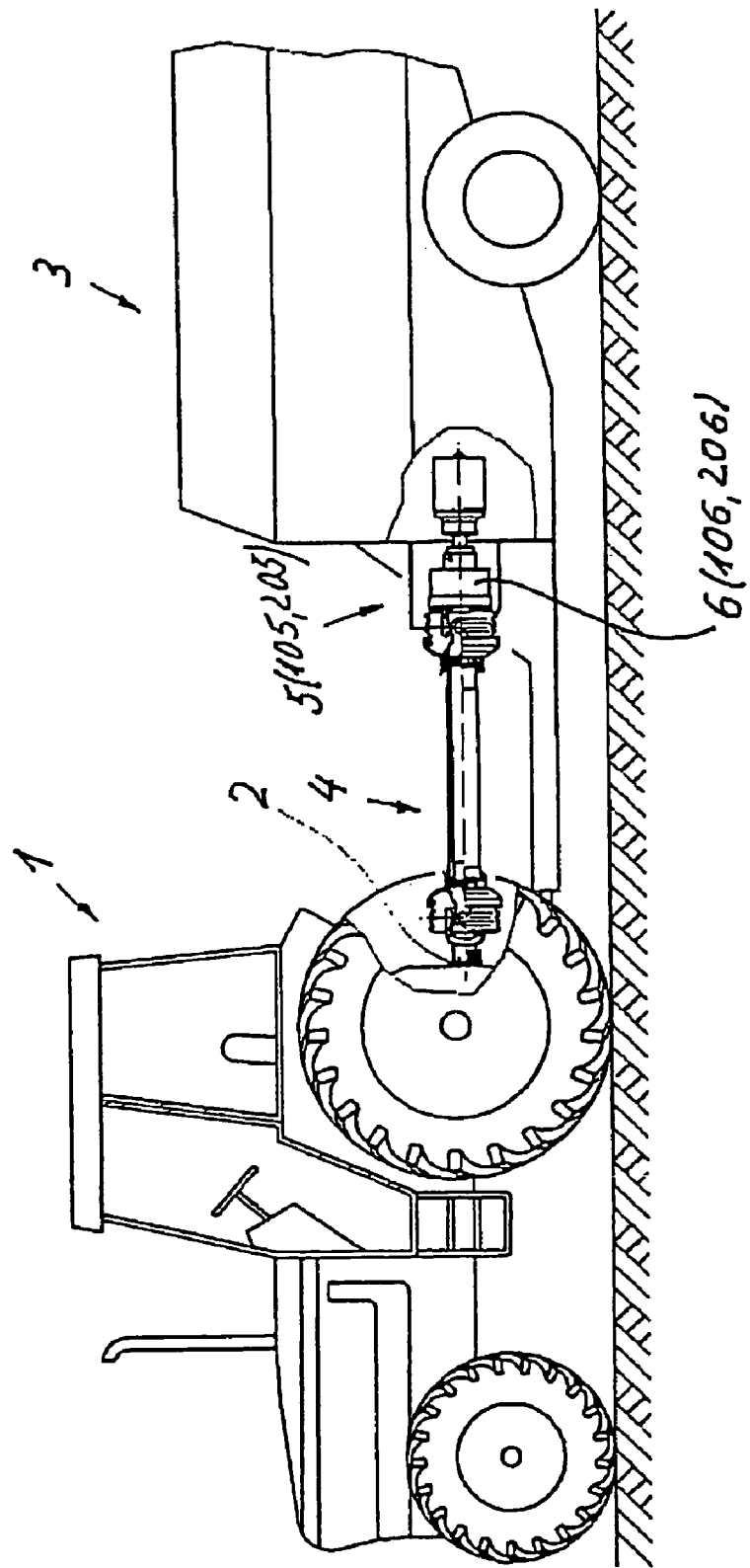

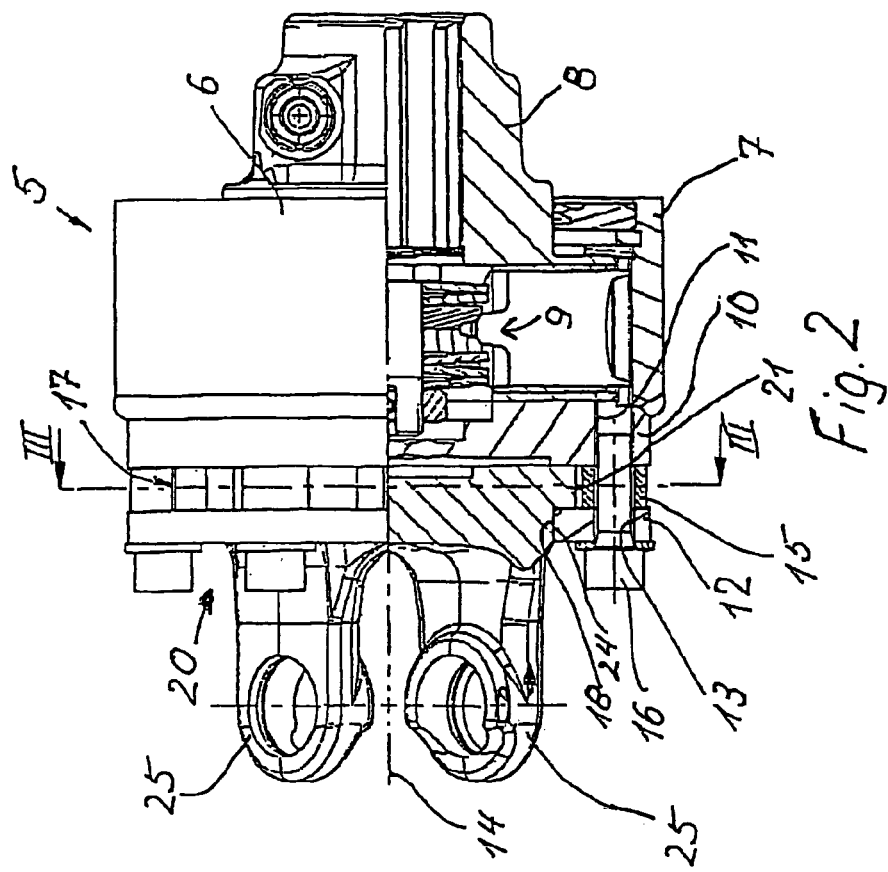
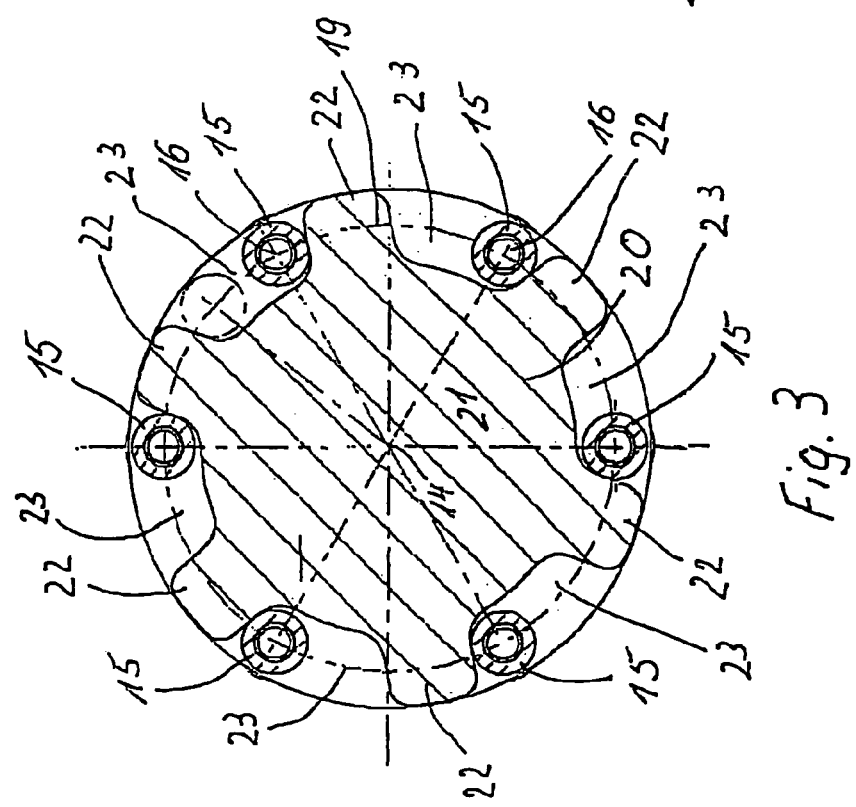

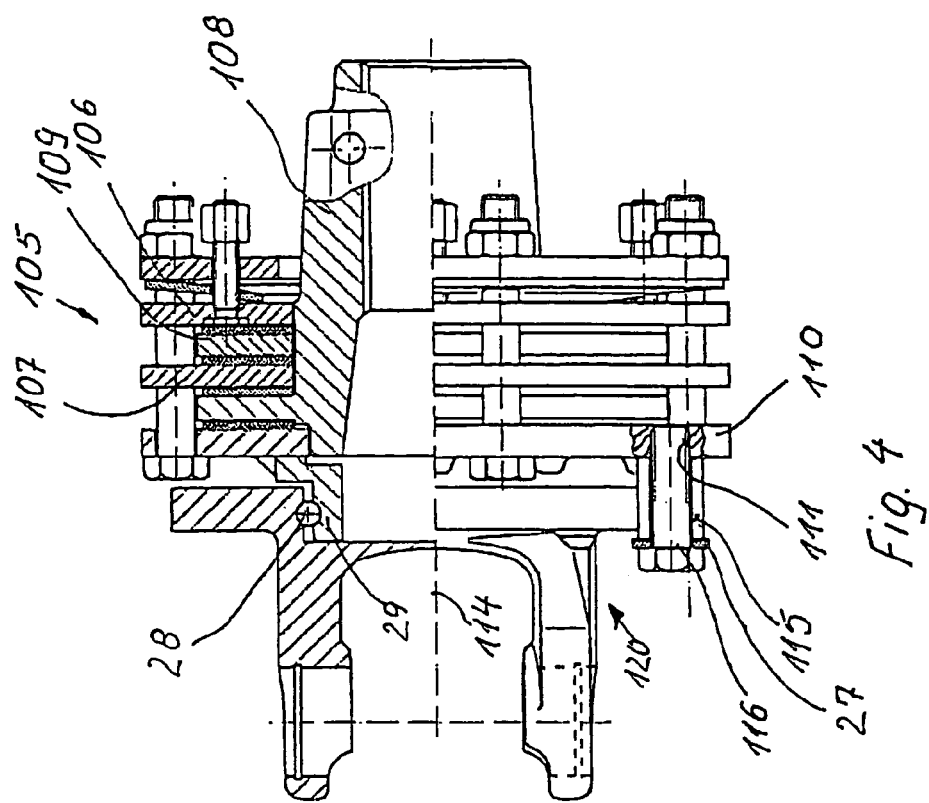
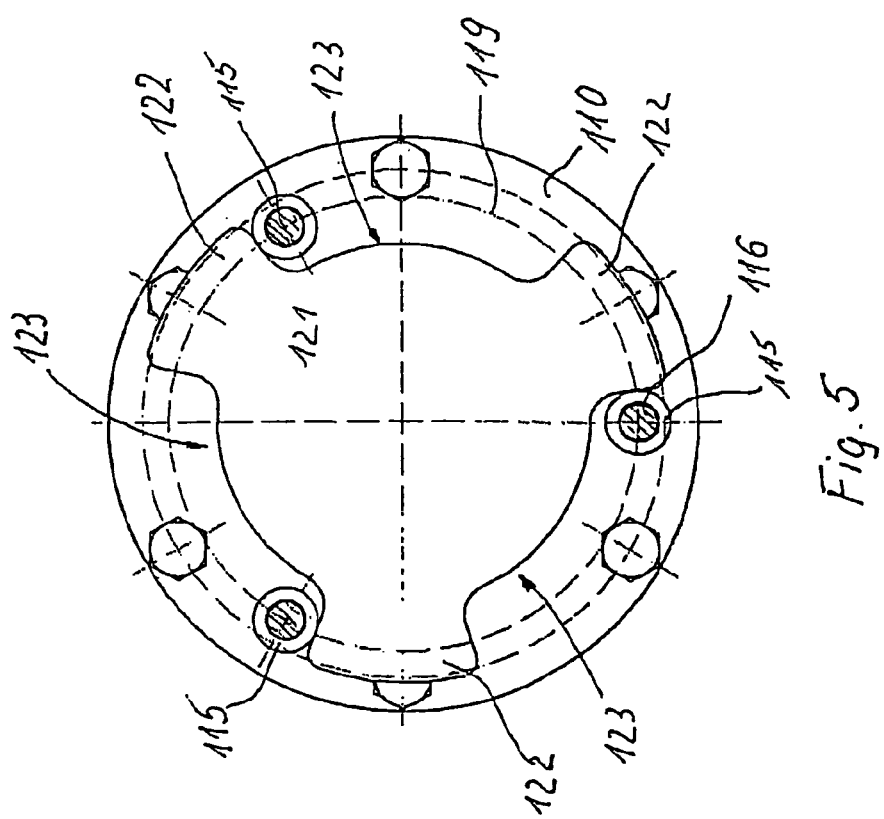

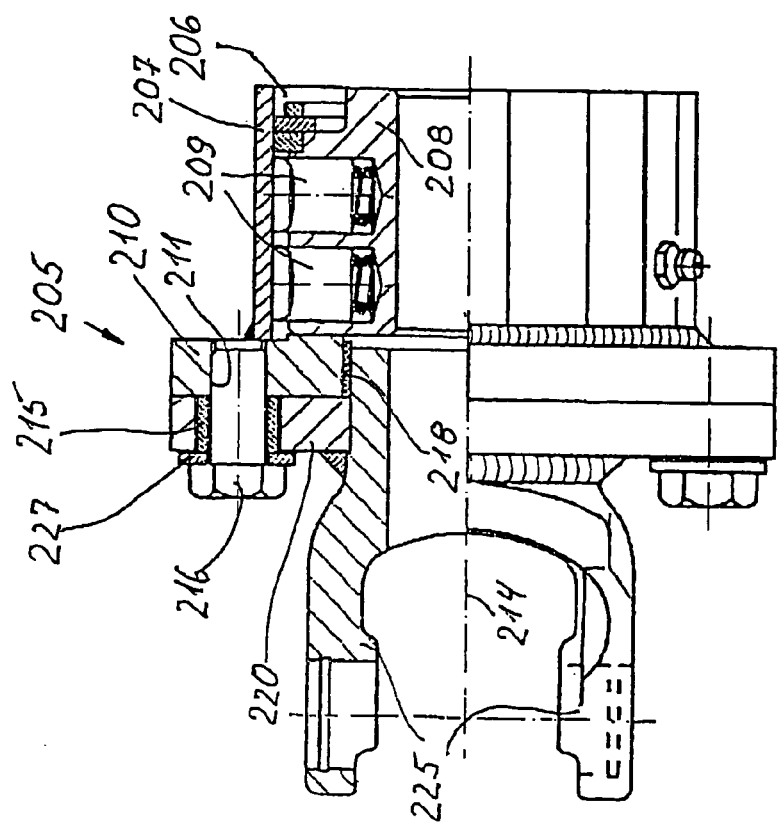
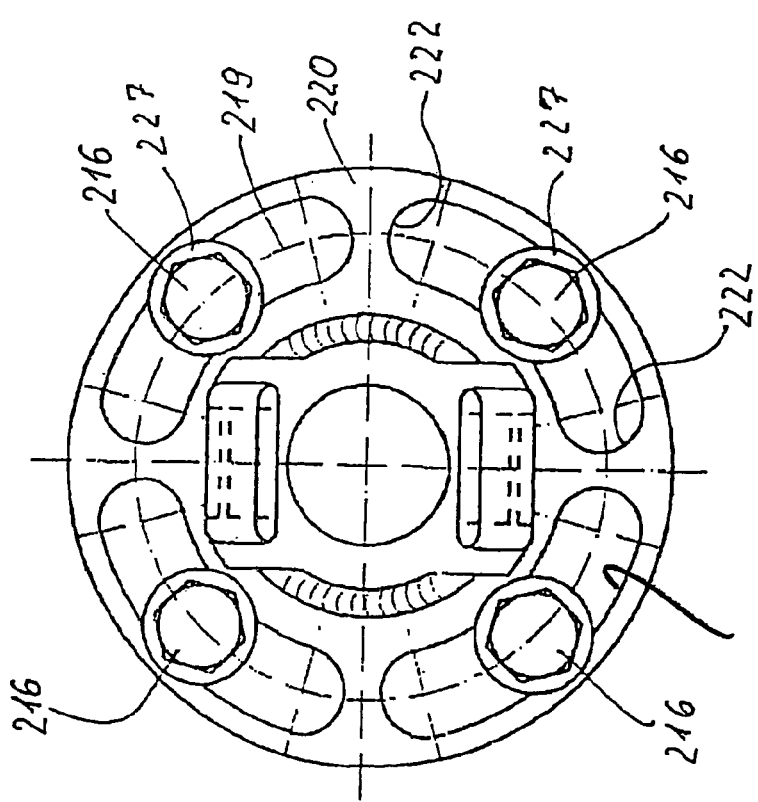

TORQUE TRANSMISSION DEVICE

FIELD OF THE INVENTION

The invention relates to a torque transmission device, especially for driving or in drives of agricultural implements or self-propelled working machines.

BACKGROUND OF THE INVENTION

In order to connect, for example, a to be driven attachment implement, to a power take-off shaft of a tractor, via a universal joint shaft, a proper procedure must be followed. Accordingly, during the coupling procedure of the universal joint shaft to the power take-off shaft, the universal joint shaft, not coupled yet, is aligned in relation to the power take-off shaft so that the universal joint shaft can be axially pushed, with its coupling portion, onto the splined power take-off shaft. This is often difficult to achieve. This is due to the fact that the attachment implements have a high mass to be accelerated which makes rotating the universal shaft by hand, to achieve the aligned position necessary for the coupling procedure, practically impossible. This also applies if the implement drive is blocked or if the tractor power take-off shaft is fixed by a brake.

To facilitate the coupling procedure, DE 44 45 634 C2 (=GB 22 96 308 A) proposes to connect two free wheel couplings one behind the other. The two coupling elements can be freely rotated in relation to each other about a limited rotational angle. This enables the components of the drive connection, for example the power take-off shaft and the coupling portion of a universal joint shaft, to be brought into a corresponding position. In a correspondingly formed splined shaft stub and bore of the coupling portion, the splines and gaps can be aligned such that an easy pushing-on and thus, coupling is possible. The size of the differences in pitch can be selected to provide a sufficiently large free rotational motion angle. This embodiment necessitates two free wheel couplings which increases the structural expenditure.

U.S. Pat. No. 5,681,222 A describes an overload frictional slip coupling with free motion in the rotational sense. The coupling has a coupling housing, a coupling hub and between the two a frictional arrangement for the transmission of torque. A universal joint yoke is fixed to the coupling housing. Both rotate together without fee rotational motion between the two. A rolling member bearing is arranged between the coupling hub and the universal joint yoke. The bearing retains both elements in relation to each other in a radial and axial direction. A coupling disc with a frictional lining is arranged between an end wall of the coupling housing and a pressure plate. The disc is connected to the coupling hub via projections and recesses. The disc enables a relative free rotational motion between the two. A disadvantage in this embodiment is that the free motion, in the rotational sense, is provided at components which form part of the frictional coupling. Such an embodiment is limited to frictional couplings.

SUMMARY OF THE INVENTION

The invention provides a torque transmission device with a driving arrangement on the coupling which enables a limited free relative rotational motion. The invention can be applied to any type of couplings without having to change the internal structure of the coupling. Further, compared to the State of the Art with two free wheel couplings, the present invention achieves a simplified structure.

The object according to the invention is a torque transmission device especially for driving or in drives of agricultural devices or self-propelled working machines. The invention includes a coupling with a first coupling element with a connection plate. A second coupling element is rotationally arranged in reference to the first coupling element. At least one torque transmission element, between the first coupling element and the second coupling element, transmits a torque in at least one rotational direction around a longitudinal axis. First driving elements are connected to the connection plate. A driving member, which includes rotational abutments, is brought into abutment with the first driving elements for torque transmission around the longitudinal axis after passing a predetermined free rotational motion. The driving member is rotationally supported around the longitudinal axis on the connection plate or on a component connected to the connection plate.

An advantage of the invention is that the driving member and the first driving element can be applied without a large constructional expenditure to any type of coupling. The coupling is arranged in a drive line for driving an implement to be coupled with a tractor or for a self-propelled working machine. This occurs without having to change the coupling or its internal structure. Furthermore, only simple components are necessary to provide a limited free rotational motion. Thus, coupling a universal joint shaft or directly coupling a driving member to a drive, for example to the power take-off shaft of a tractor or a corresponding power take-off shaft of a self-propelled working machine for coupling of an attachment device, can be achieved without applying a large expenditure of force.

Additionally, in a first embodiment, the driving member includes second driving elements distributed along the circumference around the longitudinal axis. The second driving elements radially project from a driving member portion and are formed as rotational abutments. This form gaps in the circumferential direction between the second driving elements. The first driving element engage in the gaps in a circumferential direction around the longitudinal axis with a free rotational motion.

In this case, a support plate may be provided that is held by the first driving element at an axial distance to the connection plate. The first driving elements form distance holders. Thus, a space is formed between the support plate and the connection plate. The driving member portion of the driving member is accommodated in the space in a rotatable manner.

In an embodiment of the invention, the driving member forms or comprises a universal joint yoke of a universal joint belonging to a universal joint shaft.

The support plate has a bearing bore centered on the longitudinal axis. The driving member is rotationally supported with a bearing portion. Such a support is sufficient as, in operation, substantially no relative rotational movements occur.

Preferably, the first driving elements are formed by cylindrical distance sleeves. The sleeves are supported on the connection plate. When a support plate is provided, the sleeves are also supported on the support plate. The support plate, in this case, is retained by screws passed through the distance sleeves on the connection plate. Preferably, three or six second driving elements are integrally formed as rotational abutments on the driving member portion. Additional abutments are formed by circumferential ends of circular openings in the drive element. The driving elements form three or six gaps, respectively. The provided three or six first driving elements, respectively, engage in one of the gaps.

The application of the invention is, for example, advantageous to couplings formed as torque limiting couplings. The coupling housing and the coupling hub have elastically supported torque transmission elements between them. Such a coupling is, for example, described in detail in DE 32 05 513 C1 (=U.S. Pat. No. 4,468,206). However, an application to frictional couplings or other types of couplings is also possible.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a schematic view of a tractor with an attached implement, driven via a driving connection by the power take-off shaft of the tractor.

FIG. 2 is a partial cross-section view of a representation of a first embodiment of a torque transmission device according to the present invention.

FIG. 3 is a section view along line III—III of FIG. 2.

FIG. 4 is a partial cross-section view of a second embodiment of a torque transmission device according to the invention.

FIG. 5 is a side view of FIG. 4.

FIG. 6 is a partial section view similar to FIG. 4 of a third embodiment of the present invention.

FIG. 7 is a side view of FIG. 6.

DETAILED DESCRIPTION OF THE PREFERRED EMBODIMENTS

The following description of the preferred embodiment(s) is merely exemplary in nature and is in no way intended to limit the invention, its application, or uses.

FIG. 1 illustrates a tractor 1 with a power take-off shaft 2 provided at its rear. An implement 3 is coupled to the tractor 1. A universal joint shaft 4 with a torque transmission device 5, 105, 205 according to the invention, is arranged on the input side of the implement 3. The torque transmission device 5, 105, 205 includes a coupling 6, 106 or 206. The universal joint shaft 4 is connected, via a coupling portion, to the power take-off shaft 2 of the tractor 1. Thus, a rotational driving movement can be transmitted from the power take-off shaft 2 of the tractor 1, via the universal joint shaft 4 and the torque transmission device 5 according to the invention, to the implement 3.

An embodiment of a torque transmission device 5 is described in more detail in connection with FIGS. 2 to 3.

FIG. 1 is a structural arrangement of the torque transmission device 5. The torque transmission device 5 includes the coupling 6. The coupling 6 has a coupling housing 7, as first coupling element, arranged coaxially around a coupling hub 8, which forms a second coupling element. The coupling hub 8 connects to a drive journal of the implement 3 shown in FIG. 2. The coupling hub 8 transmits a rotational movement from the tractor, via the universal joint shaft 1, to the implement 3.

Torque transmission elements 9 are between the coupling housing 7 and the coupling hub 8. The torque transmission elements 9 are in the form of spring loaded locking elements. The torque transmission elements 9 effect a switching-off when a predetermined torque is exceeded, for example, when a blockage is produced in the implement 3. Thus, the coupling 5 has a safety function. The application of the inventive idea is, however, not limited to such an embodiment of a coupling. Any type of couplings can be provided, for example, a friction coupling (see description of FIG. 5, coupling 105) according to the State of the Art, to prevent an overload when starting the implement.

The coupling housing 7 has a connection plate 10. The connection plate 10 includes threaded bores 11 distributed along the circumference around the longitudinal axis 14. On this connection plate 10, a support plate 12 is fixed by means of interposition of six first driving elements 15, formed as distance sleeves. Screws 16 pass through bores 13 in the support plate 12 and through bores of the first driving elements 15. The screws 16 are screwed into the threaded bores 11 of the connection plate 10. A space 17 is between the support plate 12 and the connection plate 10. The support plate 12 has a bearing bore 18 which is centered on the longitudinal axis 14.

The torque transmission device 5 further includes a driving member 20. The driving member 20 has a driving member portion 21. Six tooth-like second driving elements 22 or rotational abutment project around the circumference of the driving member portion 21, in this embodiment. Different numbers of second driving elements are also possible. The second driving elements 22 are distributedly arranged around the longitudinal axis 14. As seen in FIG. 3, a total of six second driving elements 22 are provided. Further, the driving member 20 has a bearing portion 24. The bearing portion 24 is cylindrically formed and fits to the bearing bore 18 of the support plate 12. The driving member 20 comprises two universal joint yoke arms 25 belonging to the universal joint which forms part of the universal joint shaft 4 of FIG. 1.

The driving member 20 is arranged with its driving member portion 21 in the space 17 between the support plate 12 and the connection plate 10. The first driving elements 15 are arranged in the gaps 23 between the second driving elements 22. In each gap 23, a free motion space is provided in the rotational direction around the longitudinal axis 14. Thus, the driving member 20 can carry out a limited relative free rotational motion (free of torque) in reference to the connection plate 10 of the coupling 6 in the rotational direction around the longitudinal axis 14. Since the driving member 20 is fixed to the universal joint shaft 4, the universal joint shaft 4 can be rotationally adjusted by hand with reference to the coupling 6. Thus, without affording a large torque, the universal joint shaft 4 of FIG. 1 can be rotated to couple to the power take-off shaft 2.

In FIG. 3, the first driving elements 15 are shown circumferentially arranged with respect to the driving member 20. From this, it is visible that the elements 15 are arranged on a circle 19 around the longitudinal axis 14. The circle is dimensioned such that the outer faces of the first driving elements 15 are arranged with a play to the base of the gap 23. Further, the relative free rotational motion of the driving member 20 in relation to the first driving elements 15 is also visible. The driving member 20 is supported in the bearing bore 18 by the bearing portion 24, so that a guiding is achieved, securing a true running.

As far as the embodiment of FIGS. 4 and 5 comprises components, which correspond to those of the embodiment of FIGS. 2 to 3, reference numerals are selected in FIGS. 4 and 5, which are increased by the numerical value 100 compared to those of FIGS. 2 to 3. In reference to the description of these components it is referred to the description of FIGS. 2 to 3.

In the following the essential differences are described. In the torque transmission device 105 of FIGS. 4 and 5 the coupling 106 is formed as a friction coupling. The coupling 106 has correspondingly a first coupling element 107, connected to the second coupling element 108 by means of torque transmission elements 109, in the form of friction discs.

Instead of the six first driving elements, three first driving elements 115 are provided. Furthermore, the arrangement of the driving member 120 to the connection plate 110 with the first driving elements 115 is shown in FIG. 5, in outline only, without the yoke arms. The driving member 120 is additionally rotationally supported via a rolling member bearing 28 on a bearing element 29 connected to the connection plate 110. The rolling member bearing 28 provides for axial retainment. A washer 27 is arranged between the first driving element 115 formed as distance sleeve, and the head of the screw 116.

The third embodiment according to FIGS. 6 and 7 concerns a torque transmission device 205, in which components, which correspond to those of the embodiment of FIGS. 2 to 3, are provided with reference numerals which are increased by the numerical value 200 compared to those of the embodiment of FIGS. 2 and 3.

In the following the essential differences are described. Instead of the coupling 6 provided in the embodiment of FIGS. 2 and 3 having a row of retaining bodies, the coupling 206 has two rows of torque transmission elements 209 in form of retaining bodies. Furthermore, the driving member 220 is supported via a bearing bore 218, provided in the connection plate 210.

The driving member 220 is provided with a disc-like portion and has four circular arc-like through holes 26 distributed on the circumference. The circumferential ends of the through holes form rotational abutments 222. First driving elements 215, in the form of distance sleeves extend through the through holes. These first driving elements 215 are connected by screws 216 with washers 227 to the connection plate 210. The driving element 220 is secured in the direction of the longitudinal axis 214 by the washers 227.

As seen in FIG. 7, the rotational direction around the longitudinal axis 214 between the first driving elements 215, of which only the screws 216 are shown, and the circumferential ends of the through bores 26, arranged distanced in circumferential direction on the circle 219, which form rotational abutments 222, provides a substantial rotational free motion. This is the relative rotational path, which the driving member 220, in relation to the connection plate 210 relative to the coupling 206 in the rotational direction around the rotational axis 215 can be moved, without transmitting a torque.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A torque transmission device for driving or in drives of agricultural devices or self-propelled working machines, comprising:

a coupling having a first coupling element with a connection plate, a second coupling element rotationally arranged to the first coupling element, at least one torque transmission element transmitting a torque in at least one rotational direction around a longitudinal axis between the first coupling element and the second coupling element;

first driving elements connected to the connection plate; and a driving member including rotational abutments, said driving member is rotated by hand by the user for aligning a universal joint shaft connected to said driving member and for enabling the rotational abutments to be brought into abutment with the first driving elements for a torque transmission around the longitudinal axis after said driving member passes through a predetermined rotational torque free and bias free motion, and said driving member rotationally supported around the longitudinal axis on the connection plate or on a component connected to the connection plate.

2. The torque transmission device according to claim 1, wherein the driving member includes said rotational abutments distributed along the circumference around the longitudinal axis and radially projecting from a driving member portion, and gaps in the circumferential direction formed between each said rotational abutments, the first driving elements are arranged in the gaps in a circumferential direction around the longitudinal axis.

3. The torque transmission device according to claim 2, further comprising a support plate held by the first driving elements at an axial distance to the connection plate, said driving elements forming distance holders, so that between the support plate and the connection plate a space is formed, and the driving member portion of the driving member is accommodated in the space in a rotatable manner.

4. The torque transmission device according to claim 3, wherein the support plate has a bearing bore centered on the longitudinal axis, in which bearing bore a driving member is rotationally supported with a bearing portion.

5. The torque transmission device according to claim 2, wherein three or six rotational abutments are integrally formed on the driving member portion, and three or six gaps are formed between said three or six rotational abutments, respectively, and three or six first driving elements are provided, respectively, in one of the gaps.

6. The torque transmission device according to claim 1, wherein the driving member forms or comprises a universal joint yoke of a universal joint belonging to a universal joint shaft.

7. The torque transmission device according to claim 1, wherein the first driving elements are formed by cylindrical distance sleeves, which are supported on the connection plate and, when a support plate is provided, are also supported on the support plate.

8. The torque transmission device according to claim 7, wherein the support plate is fixed by screws, passed through the first driving element on the connection plate.

9. The torque transmission device according to claim 1, wherein the rotational abutments are formed by circumferential ends of circular openings in the driving member, and the first driving elements are formed by distance sleeves engaging through the openings and fixed by screws on the connection plate.

10. The torque transmission device according to claim 1, wherein the coupling is formed as a torque limiting coupling, wherein retaining elements arranged as the at least one torque transmission elements are elastically supported between a coupling housing and a coupling hub.

11. The torque transmission device according to claim 1, wherein the coupling is formed as a friction coupling.

* * * * *